(12) United States Patent
Meyer et al.

(10) Patent No.: US 8,252,252 B2
(45) Date of Patent: Aug. 28, 2012

(54) PROCESSES FOR THE RECOVERY OF RUTHENIUM FROM MATERIALS CONTAINING RUTHENIUM OR RUTHENIUM OXIDES OR FROM RUTHENIUM-CONTAINING NOBLE METAL ORE CONCENTRATES

(75) Inventors: Horst Meyer, Altenstadt (DE); Matthias Grehl, Goldbach (DE); Christian Nowottny, Nidderau (DE); Martin Stettner, Altenstadt (DE); Joachim Kralik, Hanau (DE)

(73) Assignee: W.C. Heraeus GmbH, Hanau (DE)

( * ) Notice: Subject to any disclaimer, the term of this patent is extended or adjusted under 35 U.S.C. 154(b) by 0 days.

(21) Appl. No.: 13/051,047

(22) Filed: Mar. 18, 2011

(65) Prior Publication Data

US 2011/0165041 A1 Jul. 7, 2011

Related U.S. Application Data

(62) Division of application No. 12/361,590, filed on Jan. 29, 2009, now abandoned.

(30) Foreign Application Priority Data

Jan. 30, 2008 (DE) .......................... 10 2008 006 796

(51) Int. Cl.
*C22B 61/00* (2006.01)
(52) U.S. Cl. ........................................ 423/22; 423/592.1
(58) Field of Classification Search .................... 423/22, 423/592.1
See application file for complete search history.

(56) References Cited

U.S. PATENT DOCUMENTS

| 3,997,337 | A | * | 12/1976 | Pittie et al. ...................... 423/22 |
| 4,002,470 | A | * | 1/1977 | Isa et al. .......................... 75/421 |
| 4,390,366 | A | | 6/1983 | Lea et al. |
| 5,248,496 | A | | 9/1993 | Schuster et al. |
| 6,036,741 | A | | 3/2000 | Shindo et al. |
| 6,284,013 | B1 | | 9/2001 | Shindo et al. |

FOREIGN PATENT DOCUMENTS

| CN | 1 872 418 A | | 12/2006 |
| DE | 261811 A1 | | 11/1988 |
| DE | 3935798 A1 | | 5/1991 |
| DE | 10145532 A1 | | 1/2003 |
| DE | 69937224 T2 | | 1/2008 |
| EP | 1 026 283 A1 | | 8/2000 |
| EP | 1 114 796 A | | 7/2001 |
| EP | 1114795 A1 | | 7/2001 |
| EP | 1 577 408 A | | 9/2005 |
| GB | 1527758 | * | 10/1978 |
| JP | 59 104 438 | | 6/1984 |
| JP | 59 104438 A | | 8/1984 |

OTHER PUBLICATIONS

Translation of CN 1872418, Dec. 2006, pp. 1-14.*
Translation of JP 59-104438, Jun. 1984, pp. 1-9.*
EP Office Action dated Aug. 19, 2011.
Fathi Habashi, "Handbook of Extractive Metallurgy" Wiley-VCH, Weinhein, vol. 3, pp. 1292-1306, 1997.

* cited by examiner

Primary Examiner — Steven Bos
(74) Attorney, Agent, or Firm — Norris McLaughlin & Marcus PA

(57) ABSTRACT

Processes for the recovery of ruthenium from materials containing ruthenium or ruthenium oxides or from ruthenium-containing noble metal ore concentrates, with the steps of A. the introduction of the material into a highly alkaline alkali hydroxide melt in the presence of nitrate as oxidizing agent with the formation of an oxidized melt residue with water-soluble ruthenate $(RuO_4)^{2-}$, B. the dissolution of the oxidized melt residue obtained in water, C. the addition of a reducing agent, D. the precipitation of the metals formed, can also be used for separating off selenium.

Optionally, ruthenium is separated off by distillation, instead of precipitation, following step B, with the steps of 5C the treatment of the ruthenate-containing solution with an oxidizing agent, 5D distilling off of the $RuO_4$ obtained, 5E taking up of the $RuO_4$ from step 5D in hydrochloric acid.

By way of further subsequent purification steps, processes for the recovery of ruthenium targets are obtained.

6 Claims, No Drawings

PROCESSES FOR THE RECOVERY OF RUTHENIUM FROM MATERIALS CONTAINING RUTHENIUM OR RUTHENIUM OXIDES OR FROM RUTHENIUM-CONTAINING NOBLE METAL ORE CONCENTRATES

This is a Division of application Ser. No. 12/361,590 filed on Jan. 29, 2009, now abandoned.

The invention relates to processes for the recovery of ruthenium from materials containing ruthenium or ruthenium oxides or from ruthenium-containing noble metal ore concentrates, if necessary with further purification steps for processing ruthenium targets.

BACKGROUND OF THE INVENTION

Ruthenium-containing materials in which the ruthenium is present in the metallic or oxidic form (ore concentrates, target materials produced by powder metallurgy from ruthenium metal and ruthenium alloys, other cementates) need to be activated for further purification operations and converted into a water-soluble form.

Various processes are known for mobilising and/or separating off ruthenium:

- melt flow with KOH/$KNO_3$ and subsequent formation of $RuO_4$ by the oxidation of the alkaline solution with chlorine gas (JP39019951; C. Claus, J. prakt. Chem. 79 [1860] 28),
- oxidation and dissolution in HCl or $HNO_3$ with potassium chlorate as oxidising agent (F. Krauss, Z. anorg. Ch. 117 [1921] 115),
- exploiting the solubility in hypochlorite solution (Howe, JACS 47 [1925] 2928),
- alcohol precipitation of ruthenium from highly alkaline solution (C. Claus, J. prakt. Chem. 79 [1860] 28; L. Wöhler, Zeitschrift f. anorg. Chem. 139 [1924] 205-219),
- treating ruthenate solutions in sequence with chlorate and bromate (EP 1 114 795 A1),
- heating ruthenium-containing hydrochloric acid noble metal solutions and subsequent addition of chlorate and further heating of the suspension/solution formed to 80 to 90° C. and collection of the ruthenium tetroxide formed (U.S. Pat. No. 4,390,366),
- Oxidation of alkali ruthenate in aqueous solutions (DE 39 35 798 A1) in the case of which the oxidation with ozone is carried out at pH values above 8. Alternatively, the ruthenium-containing noble metal solution present can be distilled with sodium chlorate and/or chlorine gas.

Processes according to the state of the art have the following disadvantages: aqua regia or concentrated acids/chlorine gas used as oxidising agent do not dissolve ruthenium or only very slowly. Ruthenium is soluble in sodium hypochlorite liquor; however, volatile ruthenium(VIII) oxide is partly formed in this case directly. As a result, the digestion step cannot be separated from the separation step. The selenium contained in ore concentrates interferes with the purification of the noble metals in the further steps such that its rapid elimination, if possible at the beginning of the partitioning process, is desirable.

SUMMARY OF THE INVENTION

By introducing ruthenium-containing material and nitrate as oxidising agent into a highly alkaline potassium hydroxide melt, it is possible to achieve a satisfactory mobilisation of the ruthenium. Subsequently, ruthenium is present as water-soluble ruthenate $(RuO_4)^{2-}$. Subsequent partitioning operations permit a rapid removal of the ruthenium and the separation of selenium. Further subsequent purification steps permit the processing of ruthenium targets.

DETAILED DESCRIPTION

Ruthenium contained in parting products is converted into the water-soluble ruthenate form by oxidation in an alkaline melt. As a result of the corrosivity of the melt, not every crucible material is suitable for this process. Crucibles consisting of a nickel base alloy with a high proportion of chromium such as e.g.

| Type | Designation | Wst-No. |
|---|---|---|
| INCONEL ® 600 | G-Ni—Cr 15 Fe | 2.4816 |
| INCONEL ® 601 | G-Ni—Cr 23 Fe | 2.4851 |
| INCONEL ® 625 | G-Ni—Cr 22 Mo 9 Nb | 2.4856 |
| INCOLOY ® 825 | 10-Ni—Cr 21 Mo | 2.4858 |
| HASTELLOY ® C | G-Ni—Cr 18 Mo 16 | 2.4892 |
| HASTELLOY ® C 276 | G-Ni Mo 16 Cr 15 W | 2.4819 |
| CARPENTER 20 CB 3 | G-Ni Cr 20 Cu Mo | 2.4660 | have proved to be particularly suitable.

They exhibit a very low level of material abrasion.

A possible embodiment is a melt based on ore concentrate. Following the oxidation and dissolution of the cooled melt in water, the ruthenium obtained has dissolved to a level of >80%. Following filtration or siphoning off from the insoluble residue, the ruthenium can be easily precipitated by reduction (e.g. with ethanol) and separated off in this way. All noble metals, apart from ruthenium, are contained in the precipitate. During this process, selenium which may possibly be present and interferes strongly with the further purification steps of the other noble metals, is dissolved quantitatively as selenate and separated off together with ruthenium.

Apart from ethanol, other alcohols such as methanol, 1-propanol, 2-propanol or sugars such as e.g. glucose, are suitable as reducing agents.

In a further embodiment, ruthenium fines treated in a KOH melt with $NaNO_3$ are processed further by being leached with water, chlorine gas is introduced into the solution while the ruthenate is oxidised to ruthenium(VIII) oxide which is distilled off together with the gas stream and absorbed in concentrated hydrochloric acid.

The processes according to the invention have the following advantages:

Large proportions of the ruthenium content of parting products are activated and mobilised within a brief period, ruthenium being converted into a water-soluble form. For materials with a low ruthenium content, it is possible to achieve an increase in the concentration of the ruthenium by subsequent alcohol precipitation. Subsequent purification operations then permit a rapid separation of further noble and non-ferrous metals contained in the parting products.

Osmium contained in ore concentrates follows the route of ruthenium as a result of its very similar chemical properties and can be easily partitioned from ruthenium by a further reaction step following the distillation described above (other digestion routes giving the noble metals in acid solution would lead to very high losses of osmium as a result of the easy formation and great volatility of osmium(VIII) oxide).

Following the dissolution, in water, of the melt obtained according to the invention from ore concentrate, ruthenium is usually present in solution to an amount of >80% and, following filtration or siphoning off from insoluble residue, can be precipitated easily by reduction (e.g. with ethanol) and thus separated off. Similarly, the selenium which has a strongly interfering effect in the further purification steps of the other noble metals is dissolved quantitatively as selenate and can thus be separated off easily from the noble metals contained in the precipitate. This provides an effective way of eliminating selenium by the formation of water-soluble selenates. These remain in solution if Ru (and, if applicable, Os) are precipitated with the reducing agent, e.g. ethanol.

The digestion according to the invention can advantageously be used for processing Ru targets. This includes further purification steps. The following process sequence is obtained, for example:

melt oxidising by alkaline oxidation with used targets;
dissolution in water;
distillation of $RuO_4$ using chlorine as oxidizing agent;
absorption of $RuO_4$ in HCl;
concentration of the solution;
$NH_4Cl$ precipitation;
calcination of the ammonium salt at approximately 600° C., e.g. in a chamber furnace;
rolling;
reduction under hydrogen;
grinding, e.g. in a fluid bed jet mill.

The invention thus also relates to processes for the recovery of ruthenium from ruthenium targets, the comminuted targets being passed directly to a melt undergoing alkaline oxidation as described above. The targets may contain substantial proportions of non-noble metals such as chromium.

The invention is elucidated further by way of the following examples. Parts and percentages relate to the weight, as they do in the remainder of the description, unless indicated otherwise.

Example 1

In a crucible consisting of a nickel base alloy, 300 kg of potassium hydroxide are melted at 400-450° C. Once a clear melt has been formed, 100 kg of dried ore concentrate containing approximately 4-5% (w/w) of ruthenium—premixed with 75 kg of sodium nitrate—are slowly introduced into the melt with stirring. On completion of the addition, the temperature is increased to 600° C. and stirring is carried out for a further 5 hours. The melt is allowed to cool before further treatment.

Example 2

In a crucible consisting of a nickel base alloy, 300 kg of potassium hydroxide are melted at 400-450° C. Once a clear melt has been formed, 100 kg of oxide-containing ruthenium fines containing approximately 30-40% (w/w) of ruthenium premixed with 50 kg of sodium nitrate are slowly introduced into the melt with stirring. On completion of the addition, the temperature is increased to 600° C. and stirring is carried out for a further 6 hours. The melt is allowed to cool before further treatment.

Example 3

In a crucible consisting of a nickel base alloy, 275 kg of potassium hydroxide and 14 kg of sodium nitrate are melted at 400-450° C. Once a clear melt has been formed, 53 kg of metallic ruthenium fines containing approximately 98% (w/w) of ruthenium premixed with 41 kg of sodium nitrate are slowly introduced into the melt with stirring. On completion of the addition, the temperature is increased to 600° C. and stirring is carried out for a further 6 hours. The melt is allowed to cool before further treatment.

Example 4

A melt obtained according to example 1 is dissolved in 800 l of water and allowed to settle at room temperature. It is siphoned off and washed repeatedly with water, all the solutions being combined to give a total volume of approximately 1200 l. By adding 20 l of ethanol to the solution, ruthenium is precipitated as water-containing ruthenium(IV) oxide and can be filtered off via a suction filter. 25 kg of moist ruthenium (IV) oxide are obtained.

Example 5

Analogous to example 3, 84 kg of sputter targets due for recycling and consisting of 70 kg ruthenium with 17% chromium are melted in a crucible with 400 kg of potassium hydroxide and 84 kg of sodium nitrate. After cooling, the melt is dissolved in 1600 l of water and, by introducing chlorine gas, ruthenium(VIII) oxide is distilled off and this is absorbed in concentrated hydrochloric acid. The absorber solution thus obtained contains 68.87 kg of ruthenium as pure ruthenium chloride solution.

The invention claimed is:

1. Process for the recovery of ruthenium from material containing ruthenium or ruthenium oxides or from ruthenium-containing noble metal ore concentrates comprising the steps of
   A introducing the material or ruthenium-containing noble metal ore concentrates into an alkali hydroxide melt in the presence of nitrate as oxidizing agent to form an oxidised melt residue comprising water-soluble ruthenate $(RuO_4)^{2-}$,
   B dissolving the oxidized melt residue in water to form a solution,
   C adding a reducing agent to the solution,
   D precipitating water-containing ruthenium (IV) oxide.

2. Process according to claim 1 wherein step A is carried out in an apparatus made of nickel base alloy.

3. Process according to claim 2, wherein the nickel base alloy has a Cr content of at least 10% by wt.

4. Process according to claim 1, wherein the material containing ruthenium or ruthenium oxides are ruthenium targets.

5. Process according to claim 1, wherein the alkali hydroxide melt is a KOH melt.

6. Process according to claim 1, wherein the nitrate is $NaNO_3$.

* * * * *